(12) United States Patent
Kagei et al.

(10) Patent No.: US 8,734,998 B2
(45) Date of Patent: May 27, 2014

(54) SPINEL-TYPE LITHIUM TRANSITION METAL OXIDE AND POSITIVE ELECTRODE ACTIVE MATERIAL FOR LITHIUM BATTERY

(75) Inventors: Shinya Kagei, Takehara (JP); Keisuke Miyanohara, Takehara (JP); Yoshimi Hata, Takehara (JP); Yasuhiro Ochi, Takehara (JP); Tetsuya Mitsumoto, Takehara (JP)

(73) Assignee: Mitsui Mining & Smelting Co., Ltd. (JP)

(*) Notice: Subject to any disclaimer, the term of this patent is extended or adjusted under 35 U.S.C. 154(b) by 0 days.

(21) Appl. No.: 13/810,344

(22) PCT Filed: Jul. 13, 2011

(86) PCT No.: PCT/JP2011/065945
§ 371 (c)(1),
(2), (4) Date: Jan. 15, 2013

(87) PCT Pub. No.: WO2012/008480
PCT Pub. Date: Jan. 19, 2012

(65) Prior Publication Data
US 2013/0122372 A1     May 16, 2013

(30) Foreign Application Priority Data
Jul. 16, 2010 (JP) .................... 2010-162273
Dec. 28, 2010 (JP) .................... 2010-292552

(51) Int. Cl.
*H01M 4/13* (2010.01)
*H01M 4/505* (2010.01)
*H01M 4/485* (2010.01)
*C01G 49/00* (2006.01)
*C01G 45/12* (2006.01)
*C01G 51/00* (2006.01)

(52) U.S. Cl.
CPC ............. *H01M 4/505* (2013.01); *H01M 4/485* (2013.01); *Y02E 60/122* (2013.01); *Y02T 10/7011* (2013.01); *C01G 49/0072* (2013.01); *C01G 45/1242* (2013.01); *C01G 51/54* (2013.01)
USPC ....... 429/231.95; 429/209; 429/221; 429/223; 429/231.3

(58) Field of Classification Search
CPC ... H01M 4/505; H01M 4/485; H01M 10/052; Y02E 60/122; Y02T 10/7011; C01G 49/0072; C01G 52/54; C01G 45/1242; C01G 51/54
USPC ................ 429/209, 221, 223, 231.3, 231.95
See application file for complete search history.

(56) References Cited

U.S. PATENT DOCUMENTS

6,040,089 A    3/2000   Manev et al.
2010/0243952 A1*   9/2010   Kumada et al. ............ 252/182.1

FOREIGN PATENT DOCUMENTS

| JP | 11067204 A | 3/1999 |
|---|---|---|
| JP | 11214003 A | 8/1999 |
| JP | 2000500280 A | 1/2000 |
| JP | 2000154021 A | 6/2000 |
| JP | 2000228195 A | 8/2000 |
| JP | 2000340231 A | 12/2000 |
| JP | 2001335323 A | 12/2001 |
| JP | 2005522001 A | 7/2005 |
| JP | 2006252940 A | 9/2006 |
| JP | 2007149414 A | 6/2007 |
| JP | 4673451 B2 | 4/2011 |
| WO | 9838648 A1 | 9/1998 |

OTHER PUBLICATIONS

Basu, Rajiv et al., "Suppressing the charge-ordering transition in LiMn2O4 through substitution of Li by Mg", Journal of Materials Chemistry, 2000, pp. 507-510, vol. 10, The Royal Society of Chemistry.

Yamada, Atsuo et al., "Jahn-Teller instability in spinel Li-Mn-O", Journal of Power Sources, 1999, pp. 73-78, vol. 81-82, Elsevier Science S.A.

* cited by examiner

Primary Examiner — Patrick Ryan
Assistant Examiner — Ben Lewis
(74) Attorney, Agent, or Firm — The Webb Law Firm

(57) ABSTRACT

Provided is spinel-type lithium transition metal oxide (LMO) used as a positive electrode active material for lithium battery, said LMO being capable of simultaneously achieving all output characteristics (rate characteristics), high temperature cycle life characteristics, and rapid charging characteristics. The disclosed is spinel-type lithium transition metal oxide including, besides Li and Mn, one or more elements selected from a group consisting of Mg, Ti, Ni, Co, and Fe, and having crystallite size of between 200 nm and 1000 nm and strain of 0.0900 or less. Because the crystallite size is markedly large, oxygen deficiency is markedly little, and the structure is strong, when the LMO is used as a positive electrode active material for lithium secondary batteries, all output characteristics (rate characteristics), high temperature cycle life characteristics, and rapid charging characteristics can be achieved simultaneously.

20 Claims, 1 Drawing Sheet

SPINEL-TYPE LITHIUM TRANSITION METAL OXIDE AND POSITIVE ELECTRODE ACTIVE MATERIAL FOR LITHIUM BATTERY

TECHNICAL FIELD

The present invention is related to a spinel-type lithium transition metal oxide which can be used as a positive electrode active material for lithium battery. In particular, the invention is related to a spinel-type lithium transition metal oxide which can be preferably used as a material for a battery installed in an automobile.

TECHNICAL BACKGROUND

Lithium batteries, in particular lithium secondary batteries, having such characteristics as a large energy density and a long life span, are used widely as power sources for home appliances such as video cameras and portable electronic devices such as personal notebook computers and cellular phones. Recently, applications into large batteries installed in an electric vehicle (EV), a hybrid electric vehicle (HEV) and the like, are anticipated.

A lithium secondary battery is a secondary battery having a structure in which, during charging, lithium melts out from the positive electrode as an ion and moves toward the negative electrode to be stored and conversely, during discharging, the lithium ion returns from the negative electrode to the positive electrode, and it is known that the high energy density of the battery has its origin in the electric potential of the positive electrode material.

In addition to lithium transition metal oxides such as $LiCoO_2$, $LiNiO_2$ and $LiMnO_2$ having a layer structure, lithium transition metal oxide of the manganese series having a spinel structure (Fd-3m) such as $LiMn_2O_4$ and $LiNi_{0.5}Mn_{1.5}O_4$ are known as positive electrode active materials that can be used for lithium secondary batteries (also referred in the present invention to "spinel-type lithium transition metal oxide" or "LMO").

Owing to low raw material costs and the absence of toxicity, which renders it safe, there is a focus on the spinel-type lithium transition metal oxide (LMO) of the manganese series as a positive electrode active material for a large battery for an electric vehicle (EV), a hybrid electric vehicle (HEV) and the like. In addition, while excellent output characteristics are particularly demanded of a battery for an EV or HEV, on this point, compared to a lithium transition metal oxide such as $LiCoO_2$, which has a layer structure, a spinel-type lithium transition metal oxide (LMO), which allows three-dimensional insertion and desorption of Li ions, has excellent output characteristics.

Meanwhile, when cycles are repeated in a high temperature region (for instance, 45 to 60° C.) with a conventional spinel-type lithium transition metal oxide (LMO), $Mn^{2+}$ becomes more prone to elution and the eluted $Mn^{2+}$ deposits on the negative electrode, which becomes a resistance and causes deterioration of the capacity; thus, it has been said that when putting a spinel-type lithium transition metal oxide (LMO) into practical application, the issue lies in the cycle life characteristics in the high temperature region (for instance 45 to 60° C.).

Consequently, in conventional art, various methods are proposed for inhibiting oxygen deficiency to increase the cycle life characteristics in a high temperature region.

For example, in Patent Document 1, a method of inhibiting oxygen deficiency by adding lithium hydroxide after calcination at high temperature and further re-calcining at low temperature is disclosed.

In Patent Document 2, a method of inhibiting oxygen deficiency by calcining the starting materials at the temperature range of 900 to 1000° C. for 5 to 50 hours under oxidative atmosphere and subsequently re-calcining at the temperature range of 600 to 900° C. for 1 to 50 hours under oxidative atmosphere is disclosed.

In Patent Document 3, a method of producing lithium composite oxides by calcining the raw material mixture at high temperature to form a calcined product and re-calcining the calcined product under fluidized condition is disclosed.

Further, under the purpose of providing a lithium secondary battery with excellent high temperature characteristics, especially excellent high temperature storage characteristics, in Patent Document 4, a lithium secondary battery which are provided with a positive electrode active material containing lithium manganate having spinel structure, represented by the general formula (I) $Li_aMn_{2-x}M_xO_{4-\sigma}$ (in the formula (I), M represents a substituent element group (Li, Mg, Ca and Ti, or Li and Al) substituting a part of Mn; X represents the substitution amount of each substituent element group (M) in a range of $0<X\leq0.5$, a represents the amount of Li in a range of $0.1\leq a\leq 1.3$, and σ represents the amount of oxygen deficiency in a range of $0\leq\sigma\leq0.05$, respectively) and specific surface area of 1 $m^2/g$ or less is disclosed.

CITATION LIST

Patent Document

Patent Document 1: JP 2001-335323 A
Patent Document 2: JP 2006-252940 A
Patent Document 3: JP 2007-149414 A
Patent Document 4: JP 2006-252940 A

SUMMARY OF THE INVENTION

When use as a battery for an automobile is considered, for example, a battery installed in an electric vehicle (EV) or a hybrid vehicle (HEV), a rapid charging property (related to convenience or regeneration property) is required in addition to high output density (related to acceleration performance) and long cycle life (related to running cost), unlike a battery for household use. Among them, for use in an automobile, regeneration of a battery based on charging with the electricity generated by engine revolution, that is caused by rotation of tires, is frequently is performed, and therefore a rapid charging property allowing charging at high rate (that is, rate of at least 1 C) within a short time is demanded.

Under the circumstances, the invention is to provide a spinel-type lithium transition metal oxide capable of simultaneously achieving adequate output characteristics (rate characteristics), high temperature cycle life characteristics, and rapid charging characteristics.

To solve the problems described above, suggested by the invention is spinel-type lithium transition metal oxide (herein below, also referred to as "LMO") which contains, besides Li and Mn, one or more elements selected from a group consisting of Mg, Ti, Ni, Co and Fe, and has crystallite size of between 200 nm and 1000 nm and strain of 0.0900 or less.

Because the LMO of the invention has crystallite size of between 200 nm and 1000 nm and strain of 0.0900 or less, compared to conventional LMO, the crystallite size is markedly large and also strain of the crystal structure is markedly small, and therefore it is LMO with strong structure.

It is also found that, by carrying out numerous tests of a spinel-type lithium transition metal oxide containing Li and Mn, the strain can be markedly lowered by further containing one or more elements that are selected from a group consisting of Mg, Ti, Ni, Co, and Fe.

When the spinel-type lithium transition metal oxide of the invention having such characteristics is used as a positive electrode active material of a battery, all of the adequate output characteristics (rate characteristics), high temperature cycle life characteristics, and rapid charging characteristics can be achieved simultaneously.

BEST MODE(S) FOR CARRYING OUT THE INVENTION

Figure 1:
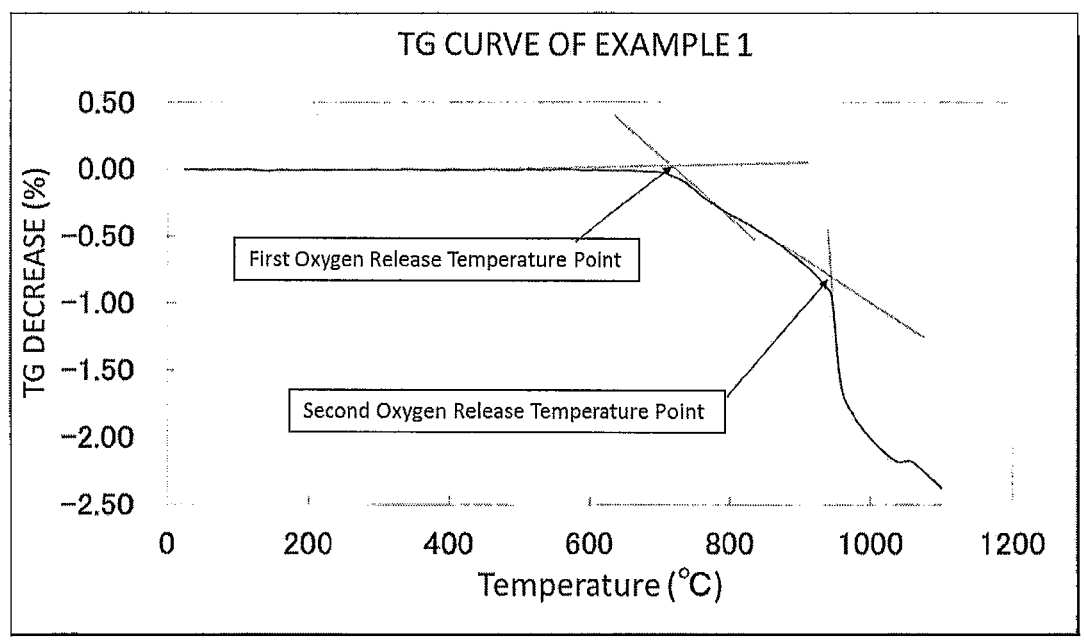
FIG. 1 is a diagram illustrating the TG curve of the spinel-type lithium transition metal oxide of the Example 1, which explains the first oxygen release temperature and the second oxygen release temperature for one example of the preferred method for producing the spinel-type lithium transition metal oxide of the invention.

Embodiments of the present invention will be described hereinafter. However, the scope of the present invention is not limited to the embodiments described below.
<LMO of the Invention>

The spinel-type (Fd-3m) lithium transition metal oxide according to the embodiment of the invention (herein below, also referred to as "LMO of the invention") is characterized in that it has crystallite size of between 200 nm and 1000 nm and strain of 0.0900 or less.
(Crystallite Size)

The LMO of the invention is characterized in that it has crystallite size of between 200 nm and 1000 nm, preferably between 250 nm and 900 nm, and more preferably between 250 nm and 600 nm.

When the LMO of the invention has crystallite size of between 200 nm and 1000 nm, input characteristics and output characteristics can be improved, and also high temperature cycle life characteristics can be improved, and as a result, output characteristics (rate characteristics), high temperature cycle life characteristics, and rapid charging characteristics can be improved.

As used herein, the term "crystallite" means the maximum group deemed a single crystal, which can be determined by XRD measurements and performing a Rietveld analysis.
(Strain)

The LMO of the invention is characterized in that it has strain of 0.0900 or less, preferably 0.0800 or less, more preferably 0.0600 or less, and most preferably 0.0400 or less. When the strain is as low as such level, the structure of the spinel-type lithium transition metal oxide is sufficiently strong, and thus when used as a positive electrode active material of lithium secondary batteries, output characteristics (rate characteristics), high temperature cycle life characteristics, and rapid charging characteristics can be improved.
(Composition)

The LMO of the invention is spinel-type (Fd-3m) lithium transition metal oxides which contain, besides Li and Mn, one or more elements selected from a group consisting of Mg, Ti, Ni, Co, and Fe. Among them, from the viewpoint of having the strain of 0.0400 or less, it is preferably spinel-type (Fd-3m) lithium transition metal oxide which contains, besides Li and Mn, one or more elements selected from a group consisting of Mg and Ti.

With regard to the content of the one or more elements selected from a group consisting of Mg, Ti, Ni, Co, and Fe, from the viewpoint of eliminating the strain, the total amount of more than 0% by weight (with the proviso that, it is 1000 ppm or more) but the same or less than 1.8% by weight is preferable. It is preferably 0.2 to 1.0% by weight, more preferably, 0.4 to 0.6% by weight.

When the amount is less than 1000 ppm, it has almost no effect on performances when the LMO of the invention is used as a positive electrode active material of a battery, and therefore impurities having content of less than 1000 ppm for each are allowed. Examples of the impurities presumably encompass Ca, Cr, and Cu.
(Specific Surface Area)

BET specific surface area (SSA) of the LMO of the invention is preferably 0.1 to 0.4 $m^2/g$, and more preferably 0.1 to 0.3 $m^2/g$ or so, in particular.

In general, better rate characteristics are obtained when the specific surface area is large while poor rate characteristics are obtained when the specific surface area is small. However, the LMO of the present invention is characteristic in that, even the specific surface area is small, it exhibits excellent rate characteristics. This may be due to the reason that the crystallite size is large and at the same time the strain is extremely small.
(Crystallite Size/BET Specific Surface Area)

From the results of the Examples described below and various tests which have been conducted until now, it was found that, for the LMO of the invention, having the ratio of crystallite size relative to the BET specific surface area (SSA), that is, the crystallite size/BET specific surface area value, in the range of 1500 $nm/(m^2/g)$ to 3000 $nm/(m^2/g)$, preferably in the range of 1700 $nm/(m^2/g)$ to 3000 $nm/(m^2/g)$, and more preferably in the range of 2400 $nm/(m^2/g)$ to 3000 $nm/(m^2/g)$ is favorable from the viewpoint of high temperature cycle life characteristics (1 C), in particular.
<Production Method>

Next, one example of the method for producing the LMO of the invention is explained.

By mixing the raw materials, calcining them at the temperature of 850° C. or higher under normal pressure in an air atmosphere, and heating them under an environment having higher oxygen pressure than normal atmosphere, the LMO of the invention can be obtained. Detailed explanations are given below.
(Raw Materials)

As a starting material, at least a lithium raw material, a manganese raw material, a magnesium raw material, a titanium raw material, a nickel raw material, a cobalt raw material, and an iron raw material can be suitably selected.

Examples of the lithium raw material include, although not specifically limited, lithium hydroxide (LiOH), lithium carbonate ($Li_2CO_3$), lithium nitrate ($LiNO_3$), $LiOH.H_2O$, lithium oxide ($Li_2O$), and other lithium fatty acids or lithium halides. Of these, hydroxide, carbonate, and nitrate of lithium are preferable.

Examples of the manganese raw material that may be used include any one selected from manganese dioxide, trimanganese tetraoxide, dimanganese trioxide, and manganese carbonate, and a combination of two or more selected therefrom.

Examples of the manganese dioxide that may be used include chemically synthesized manganese dioxide (CMD), electrolyzed manganese dioxide obtained by electrolysis (EMD), manganese carbonate, and natural manganese dioxide.

Examples of the raw materials for magnesium, titanium, nickel, cobalt, and iron that may be used include, although not specifically limited, oxides, hydroxides, fluorides, and nitrates of each element. Of these, the oxides are preferable.

(Mixing of Raw Materials)

For mixing the raw materials, there is no particular limitation regarding the method therefor as long as the mixing is homogeneous. For instance, it suffices to use a well known mixing machine such as a mixer, add each source simultaneously or in a suitable sequence and stir-mix wet or dry. In the case of adding an element which is difficult to replace, it is desirable to adopt a wet mixing.

Examples of a dry mixing include a mixing method using a fine mixing apparatus for stirring the mixing powder at high speed.

Meanwhile, in the case of wet mixing, it is desirable to add liquid media such as water and dispersant, wet-mix to obtain a slurry and grind the obtained slurry with a wet-grinding machine. In particular, it is desirable to grind to submicron order. After grinding to submicron order, performing granulation and calcination can increase the homogeneity of each particle prior to calcination reaction, allowing the reactivity to be increased.

(Granulation)

The raw materials mixed as described above may be granulated to a predetermined size and then calcined as necessary. However, it is not essential to carry out the granulation.

As long as the various raw materials that are ground in the previous step do not separate and are dispersed in the granulation particles, the granulation method may be wet or dry, extrusion granulation method, tumbling granulation method, fluidized granulation method, mixing granulation method, spray drying granulation method, compression molding granulation method, or flake granulation method using a roll or the like. However, if wet granulation is performed, drying thoroughly prior to calcination is necessary.

As far as drying methods, it suffices to dry by a well-known method such as spray heat drying method, hot air drying method, vacuum drying method, and freeze-drying method, among which spray heat drying method is desirable. It is desirable to perform spray heat drying method using a hot spray dryer (spray dryer). Granulating with a hot spray dryer (spray dryer) not only allows the particle size distribution to be sharper but also allows a preparation of secondary particles to contain aggregated particles (secondary particles) that aggregated spherically.

(Calcination)

Calcination may be carried out under air atmosphere.

By performing the calcination under air atmosphere, crystal growth is promoted, and as a result, the large crystallite size can be obtained.

For having large crystallite size by promoting the crystal growth with high temperature calcination, the calcination temperature is preferably 850° C. or higher, more preferably 910 to 1,050° C., and still more preferably 910 to 980° C.

The calcination temperature means the temperature of the calcined product measured when a thermocouple is brought into contact with the calcined product inside the calcination furnace.

The calcination time, that is, the time maintaining the aforementioned calcination temperature, is for 0.5 to 30 hours, although it may vary depending on the calcination temperature.

There is no particular limitation on the type of calcination furnace. For instance, a rotary kiln, a stationary furnace, and other calcination furnaces may be used to perform calcination.

(Heat Treatment)

Next, it is important to carry out the heat treatment in the temperature range of between the first oxygen release temperature and the first oxygen release temperature +50° C. under an atmosphere which has at least higher oxygen partial pressure than air. By performing the heat treatment under the condition, strain of the crystallite can be lowered.

With regard to the atmosphere of the heat treatment, it is preferable that the oxygen partial pressure is 0.03 MPa or more and also the oxygen partial pressure is higher than that of the calcination. It is more preferable that the heat treatment is carried out while controlling the partial pressure to 0.05 MPa or more, in particular 0.08 MPa or more. By performing the heat treatment under an atmosphere with high oxygen partial pressure, the oxygen can be easily received in terms of the equilibrium theory, and as a result, the strain can be lowered while the oxygen deficiency is suppressed.

As a method of controlling to the atmosphere with higher oxygen partial pressure than air, it is preferable that the heat treatment is carried out while introducing oxygen gas with oxygen concentration of 80% to 100%. By performing the heat treatment with constant supply of fresh oxygen, oxygen is more easily received, and as a result, the oxygen deficiency can be further suppressed.

Further, pressure of the atmosphere for the heat treatment is preferably controlled to pressure higher than atmospheric pressure, for example, to 0.102 MPa to 1.5 MPa. By pressurizing the oxygen atmosphere, oxygen can be more easily received, and as a result, the oxygen deficiency can be further suppressed.

From the viewpoint of the above, pressure of the atmosphere for the heat treatment is preferably controlled to 0.102 MPa to 1.5 MPa, more preferably controlled to 0.11 MPa to 1.3 MPa, and still more preferably controlled to 0.11 MPa to 1.0 MPa.

The heat treatment is preferably carried out by maintaining the temperature range of between the first oxygen release temperature and the first oxygen release temperature +50° C., more preferably the temperature range of between the first oxygen release temperature and the first oxygen release temperature +30° C., and still more preferably the temperature range of between the first oxygen release temperature and the first oxygen release temperature +20° C.

The heat treatment temperature means the temperature of the calcined product measured when a thermocouple is brought into contact with the materials inside the furnace.

When heated to the temperature near the first oxygen release temperature, the lithium transition metal oxide becomes unstable as thermal vibration of Mn—O increases to antagonize the binding force of Mn—O. Thus, by carrying out the heat treatment with forced supply of oxygen in the temperature range of between the first oxygen release temperature and the first oxygen release temperature +50° C., the oxygen can be introduced to the crystal structure and the strain can be effectively reduced.

Further, the first oxygen release temperature can be obtained as an initiation temperature at which the weight loss starts to appear in the temperature range of 600° C. to 900° C. after heating the calcined spinel-type lithium transition metal oxide (see, FIG. 1).

In this case, temperature increase rate is preferably 0.5° C./min to 4° C./min, more preferably 0.5° C./min to 3° C./min, and still more preferably 0.5° C./min to 2° C./min.

For the heat treatment, the time for maintaining the above temperature range needs to be at least 1 minute. It is believed that at least 1 minute is required for having oxygen at sufficient level in the crystal structure. From this point of view, the time for maintaining is preferably 5 minutes or more, and particularly preferably 10 minutes or more.

With regard to the temperature decrease rate after the heat treatment, it is preferable that the cooling is carried out slowly at cooling rate of 10° C./min or less, in particular it is more preferably controlled to 0.1° C./min to 8° C./rain, and still more preferably to 0.5° C./min to 5° C./min, at least to 500° C.

Since the oxygen received near the first oxygen release temperature is believed to be stable, it can be considered that the cooling is carried out slowly with temperature decrease rate of 10° C./min or less until it passes near the first oxygen release temperature, that is, at least to 500° C.

<Characteristics/Use>

The LMO of the invention, after being crushed/sorted as necessary, can be used effectively as a positive electrode active material of a lithium battery.

For instance, a positive electrode composite material can be produced by mixing the LMO of the invention, a conducting material comprising carbon black or the like, and a binder comprising Teflon (registered trade mark) binder or the like. Then, such a positive electrode composite material can be used for the positive electrode, a material capable of storing and releasing lithium, such as, lithium or carbon, can be used for the negative electrode, and a lithium salt such as lithium hexafluophosphate ($LiPF_6$) dissolved in a mixed solvent such as ethylene carbonate-dimethyl carbonate can be used for the non-aqueous electrolyte to construct a lithium secondary battery. However, limitation to a battery with such a constitution is not meant.

Since a lithium battery provided with the LMO of the invention as the positive electrode active material exhibits both excellent life characteristics (cycle life characteristics) and output characteristics when used by repeating charge and discharge in the central region of the depth of charge and discharge (for instance, 50 to 80% SOC), it is particularly excellent for applications in positive electrode active material of large type lithium batteries, in particular, for use as power sources to drive motors that are installed in electric vehicles (EVs) or hybrid electric vehicles (HEVs).

<Explanation of Expressions>

Note that a "HEV" is a vehicle that combines the use of two sources of driving forces: an electric motor and an internal combustion engine.

In addition, "lithium battery" is meant to include all batteries containing lithium or lithium ion inside the battery, such as a lithium primary battery, a lithium secondary battery, a lithium ion secondary battery, and a lithium polymer battery.

When expressed as "main material" in the invention, it includes the meaning that, within a range the function of the main material is not obstructed, other components are allowed to be contained. Although it is not intended to specify the content ratio of the main material, the main material corresponds to at least 50% by mass or more, preferably 70% by mass or more, and more preferably 90% by mass or more (including 100%) in the total amount.

In the present specification, when the expression "X to Y" (X and Y are any numbers) is used, unless explicitly mentioned otherwise, the meaning of "X or greater but Y or lower" is included and at the same time the meaning of "preferably greater than X" or "preferably less than Y" is included.

In addition, when the expression "X or more" (X is any number) or "Y or less" (Y is any number) is used, the meaning of "those bigger than X are preferable" or "those smaller than Y are preferable" is also included.

EXAMPLES

In the following, the present invention will be described further based on Examples and Comparative Examples, however, the present invention is not to be limited to Examples indicated below.

<Measurement of the First Oxygen Release Temperature>

40 mg of the spinel-type lithium transition metal oxide obtained after calcination was weighed, placed in a $Al_2O_3$ deep dish vessel, and under the flow of air in an amount of 100 mL/min (oxygen partial pressure: 0.021 MPa and oxygen concentration: 21%), heated to 1100° C. with temperature increase rate of 5° C./min. From the TG curve obtained (see, FIG. 1), the weight loss initiation temperature in the range of 600° C. to 900° C. was obtained as the "first oxygen release temperature."

For the thermal analysis, TG-DTA apparatus (trade name: TG-DTA 2000S, manufactured by Mac Science) was used.

<Measurement of XRD>

For the samples (powders) obtained in Examples and Comparative Examples, the crystallite size and strain were measured by the Rietveld method using the fundamental method described in the following.

The Rietveld method using the fundamental method is a method whereby the structural parameters of a crystal are refined from the diffraction intensities obtained by powder x ray diffraction or the like. It is a method in which a crystal structure model is hypothesized, and various parameters of this crystal structure are refined in such a way that the x ray diffraction pattern derived by calculations from this structure matches as much as possible the actually measured x ray diffraction pattern.

The x ray diffractometer (trade name: D8 ADVANCE, manufactured by Bruker AXS) using a Cu—Kα beam was used for the measurements of x ray diffraction patterns. Peaks of the x ray diffraction patterns obtained from the range of diffraction angle 2θ=10 to 120° were analyzed using an analysis software (product name: "Topas Version 3") to determine the crystallite size and strain.

Note that, it was hypothesized that the crystal structure belonged to the cubic crystal from the space group Fd-3m (Origin Choice 2), and that Li is present at the 8a site thereof, Mn, a substitute element of Mn (for example, Mg, Ti, Ni, Co, and Fe), and an extra Li fraction x are present at the 16d site thereof, and O is present at the 32e site thereof, the parameter Beq. was fixed to 1, and with the fractional coordinates of oxygen serving as variables and watching for the indices representing the extent of the match between the observed intensities and the calculated intensities Rwp<10.0 and GOF<2.0, the calculation was performed repeatedly until they converged, as listed in Table. Note that the crystallite size and the strain were analyzed using the Gauss function.

The instrument specifications, conditions, and the like that are used for other measurements and Rietveld method analyses were as follows:
Detector: PSD
Type Detector: VANTEC-1
High Voltage: 5585 V
Discr. Lower Level: 0.35 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.004933548 Th
<BET Specific Surface Area (SSA)>

By using MONOSORB (trade name, manufactured by Yuasa Ionics Inc.), the measurement of BET specific surface area (SSA) was carried out with reference to "6.2 (3.5) Single point method in Flow method" of JISR 1626-1996 (method for measurement of specific surface area based on gas adsorption BET of fine ceramics powder).

At the time of measurement, a mixture gas containing helium as carrier gas and nitrogen as adsorptive gas was used.
<Evaluation of Battery>
(Fabrication of Battery)

Evaluation of a Li battery was performed according to the method described below.

A paste was prepared by weighing accurately 8.80 g of the positive electrode active material (the spinel-type lithium transition metal oxide obtained from Examples and Comparative Examples), 0.60 g of acetylene black (manufactured by Denki Kagaku Kogyo Kabushiki Kaisha), and 5.0 g of a 12% by weight solution of PVDF (manufactured by Kishida Chemical Co., Ltd.) dissolved in NMP (N-methyl pyrrolidone), and adding 5 mL of NMP thereto and mixing thoroughly. This paste was placed on an aluminum foil which serves as a collector, coated with an applicator adjusted to have a gap of 250 μm and turned into a film, vacuum-dried for one day at 120° C., then, punched with φ 16 mm, and compressed by pressing at 4 t/cm² to be turned into a positive electrode. Right before the battery fabrication, the adsorbed moisture was removed by vacuum drying at 120° C. for 120 minutes or longer, and the resultant was fitted into the battery. In addition, the mean value of the weight of the φ 16 mm aluminum foils was pre-determined, the weight of the aluminum foil was subtracted from the weight of the positive electrode to determine the weight of the positive electrode composite material, and the content in the positive electrode active material was determined from the mixing ratios of the positive electrode active material, acetylene black, and PVDF.

Figure 2:
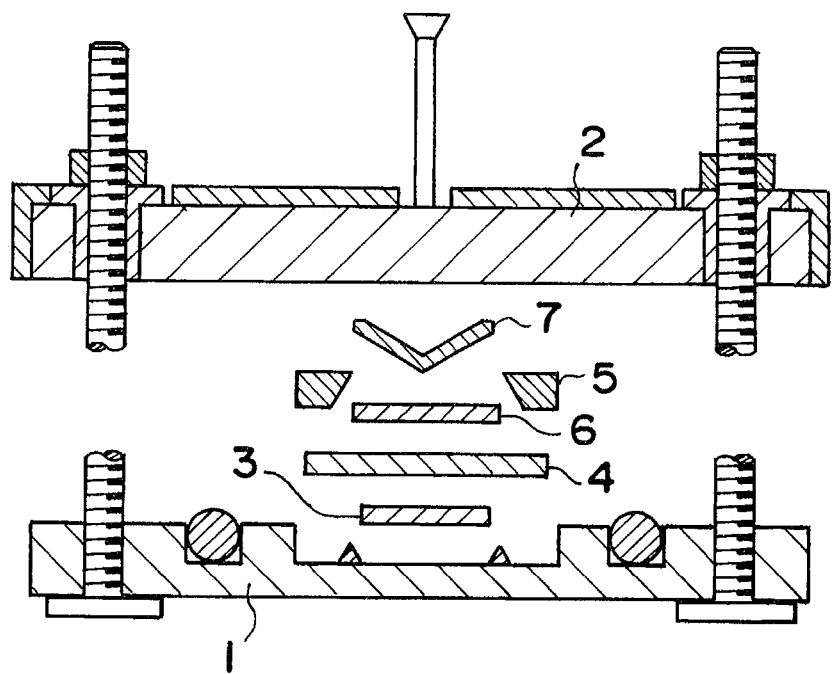
FIG. 2 is a diagram for illustrating the constitution of an electrochemical cell which has been fabricated for evaluation of the characteristics of a sample battery obtained in the Examples and Comparative Examples.

The negative electrode was a φ 20 mm×1.0 mm thick metallic Li, and these materials were used to fabricate TOMCEL (registered trade mark), that is a cell for electrochemical evaluation, illustrated in FIG. 2.

As to the electrochemical cell of FIG. 2, a positive electrode 3 comprising the positive electrode composite material positioned at the inner center of a lower body 1 made of organic electrolytic solution-resistant stainless steel. A separator 4 made of microporous polypropylene resin impregnated with an electrolytic solution was placed on the top surface of this positive electrode 3, and the separator was secured with a Teflon (registered trade mark) spacer 5. In addition, on the top surface of the separator, a negative electrode 6 comprising metallic Li was placed at the bottom, a spacer 7 doubled with a negative terminal was placed, and from above, this was covered with an upper body 2, which was fastened with screws to seal the battery.

The electrolytic solution used was the one in which EC and DMC mixed at 3:7 in volume served as a solvent, into which 1 mol/L LiPF$_6$ was dissolved as solute.
(Evaluation of High Temperature Cycle Life Characteristics)

The electrochemical cell prepared as described above was used for the charging and discharging test and determination of the high temperature cycle life characteristics by the methods described below.

A cell was placed in an environment tester which was set in such a way that the ambient temperature at which the battery is charged and discharged was at 45° C., the cell was prepared so it could be charged and discharged, left for four hours so that the cell temperature reaches the ambient temperature, then, two cycles of charge and discharge were performed at 0.1 C with the charge and discharge range of 3.0 V to 4.3 V, then, with a charge and discharge depth of 50 to 80% SOC, charge and discharge cycle was performed 47 times at 1 C, and for the 50th cycle, in order to verify the capacity, charge and discharge was performed at 0.1 C with a charge and discharge range of 3.0 V to 4.3 V.

The percentage (%) of the value was determined by dividing the discharge capacity at the 50th cycle by the discharge capacity at the 2nd cycle to obtain the value for high temperature cycle life characteristics (0.1 C). Further, the same cycle condition was performed except that 0.1 C is changed to 1.0 C to obtain the value for high temperature cycle life characteristics (1.0 C). Both values were indicated as a relative value in Table 2 when the value of Comparative Example 2 was taken as 100.
(Rapid Charge Characteristics)

By using the electrochemical cell fabricated as described above, the charge and discharge test was performed by the methods described below, and the rapid charge characteristics were obtained.

First, from the content of a positive electrode active material in the positive electrode, current value was calculated to have charge rate of 0.1 C or 3.0 C. The charge capacity (mAh/g) with a charge and discharge range of 3.0 V to 4.3 V was measured when constant current charging was performed at 20° C. based on the current values at each rate. Then, the percentage (%) of the value obtained by dividing the charge capacity at 3.0 C by the charge capacity at 0.1 C was taken as the rapid charge characteristics. All the values were indicated as a relative value in Table 2 when the value of Comparative Example 4 was taken as 100.

Examples 1 to 3

Lithium carbonate 1770.9 g, electrolytic manganese dioxide 7500 g, and magnesium oxide 65.7 g were mixed for 5 minutes by using a fine mixer (Vertical granulator (trade name: FM-VG-25, manufactured by Fuji Sangyo Co., Ltd.)) at blade revolution number of 400 rpm and high cross screw speed.

The interior of a calcination container (crucible made of alumina, size=length*width*height=10*10*5 (cm)) was filled with the obtained mixed powder in such a way that the ratio between the open surface area and the filling height (open surface area cm²/filling height cm) is 100. Then, using a stationary electric furnace, as listed in Table 1, the temperature was raised at the temperature increase rate of 150° C./hr from ordinary temperature to the set calcining temperature, retained at the calcination temperature (retention temperature) listed in Table 1 for 14 hours, thereafter, the temperature was lowered at the rate of decrease in temperature=20° C./hr from the retention temperature to 600° C., and thereafter cooling to ordinary temperature was let to take place spontaneously. Note that the temperature fluctuation during the retention time was controlled within the range of ±5° C.

The calcined powder obtained by calcination was crushed with a pestle and mortar, sorted with a sieve having mesh size of 53 μm, and the powder under the sieve was collected and obtained as a crushed sample.

Next, the crushed sample obtained from the above was subjected to the heat treatment by using a heating apparatus with tube furnace (manufactured by KOYO THERMO SYSTEMS CO., LTD.). Specifically, 200 g of the crushed sample was filled in a porcelain boat, and the calcination boat filled with the sample was placed near the center of the tube furnace. Then, while introducing oxygen gas (oxygen concentration: 100%) to the tube furnace at flow amount of 0.5 L/min, the sample was heated to the set temperature listed in Table 1 with the temperature increase rate of 1.7° C./min. After reaching the set temperature, it was maintained for a predetermined time. After that, while continuously introducing oxygen, cooling to the room temperature was performed with the temperature decrease rate listed in Table 1 to obtain the spinel-type lithium transition metal oxide (sample).

Further, the oxygen concentration was measured by using the oxygen concentration analyzer (trade name: XPO-318, manufactured by NEW COSMOS ELECTRIC CO., LTD.) (ditto for Comparative Examples described below).

The temperature for calcination and heat treatment is the product temperature when a thermocouple is brought into contact with the treatment product inside the furnace (ditto for Comparative Examples described below).

Comparative Example 1

The spinel-type lithium transition metal oxide (sample) was obtained in the same manner as Example 1 by using the same raw materials as Example 1 and performing the mixing, calcination, crushing, and sorting except that the heat treatment is not carried out.

Comparative Example 2

The crushed sample was obtained in the same manner as Example 1 by using the same raw materials as Example 1 and performing the mixing, calcination, crushing, and sorting.

Next, the crushed sample obtained from the above was subjected to the heat treatment by using a stationary electric furnace. Specifically, 200 g of the crushed sample was filled in a porcelain boat, and under the air atmosphere (atmospheric pressure: 0.10 MPa and oxygen partial pressure: 0.021 MPa), the sample was heated to the set temperature listed in Table 1 with the temperature increase rate of 1.7° C./min. After reaching the set temperature, it was maintained for a predetermined time. After that, while continuously introducing oxygen, cooling to the room temperature was performed with the temperature decrease rate listed in Table 1 to obtain the spinel-type lithium transition metal oxide (sample).

Comparative Example 3

The spinel-type lithium transition metal oxide (sample) was obtained in the same manner as Comparative Example 1 except that the atmosphere for the calcination was changed to increased oxygen pressure as listed in Table 1.

Comparative Example 4

The spinel-type lithium transition metal oxide (sample) was obtained in the same manner as Example 1 by performing the mixing of raw materials to heat treatment except that the blending composition of the raw materials is changed to lithium carbonate 1852.3 g, electrolytic manganese dioxide 7500 g, magnesium oxide 171.00 g, titanium oxide 186.36 g, and calcium oxide 26.17 g and the condition for the calcination and heat treatment is changed to the condition described in Table 1.

Examples 4 to 6

The spinel-type lithium transition metal oxide (sample) was obtained in the same manner as Example 1 by using the same raw materials as Example 1 and performing the mixing of raw materials to heat treatment except that the atmosphere for the heat treatment and the time of the heat treatment are changed to the conditions described in Table 1.

Example 7

The spinel-type lithium transition metal oxide (sample) was obtained in the same manner as Example 1 by performing the mixing of raw materials to heat treatment except that the blending composition of the raw materials is changed to lithium carbonate 1770.9 g, electrolytic manganese dioxide 7500 g, magnesium oxide 32.87 g, and titanium oxide 64.48 g and the condition for the calcination and heat treatment is changed to the condition described in Table 1.

Example 8

The spinel-type lithium transition metal oxide (sample) was obtained in the same manner as Example 1 by performing the mixing of raw materials to heat treatment except that the blending composition of the raw materials is changed to lithium carbonate 1770.9 g, electrolytic manganese dioxide 7500 g, and nickel hydroxide 146.68 g and the condition for the calcination and heat treatment is changed to the condition described in Table 1.

Example 9

The spinel-type lithium transition metal oxide (sample) was obtained in the same manner as Example 1 by performing the mixing of raw materials to heat treatment except that the blending composition of the raw materials is changed to lithium carbonate 1770.9 g, electrolytic manganese dioxide 7500 g, and cobalt oxyhydroxide 145.48 g and the condition for the calcination and heat treatment is changed to the condition described in Table 1.

Examples 10 to 28 Comparative Examples 5 and 6

The spinel-type lithium transition metal oxide (sample) was obtained in the same manner as Example 1 by using the same raw materials as Example 1 and performing the mixing of raw materials to heat treatment except that the blending condition and the condition for the calcination and heat treatment are changed to the conditions described in Table 3.

Example 29

The spinel-type lithium transition metal oxide (sample) was obtained in the same manner as Example 1 by using the same raw materials as Example 1 and performing the mixing of raw materials to heat treatment except that the condition for the calcination and heat treatment is changed to the condition described in Table 1.

Example 30

The spinel-type lithium transition metal oxide (sample) was obtained in the same manner as Example 1 by performing the mixing of raw materials to heat treatment except that the blending composition of the raw materials is changed to lithium carbonate 1745.2 g, electrolytic manganese dioxide 7500 g obtained by neutralization with sodium (sodium amount: 2800 ppm), and magnesium oxide 65.7 g and the condition for the calcination and heat treatment is changed to the condition described in Table 1.

Example 31

Lithium carbonate, electrolytic manganese dioxide, and titanium oxide were weighed such that they have a molar ratio of Li:Mn:Ti=1.06:1.903:0.037. Then, water was added in an amount of 9 times in weight ratio relative to the solid matter, and mixed and stirred to prepare 10% by weight slurry.

To the obtained slurry (raw material powder: 500 g), an ammonium salt of polycarboxylic acid (trade name: SN dispersant 5468, manufactured by San Nopco Limited) was added as a dispersant at 5% by weight with respect to the slurry solid content, and ground with a wet grinder at 3400 rpm for 40 minutes to obtain a mean particle diameter (D50) of less than 1 μm, that is, submicron order.

Next, the obtained ground slurry was granulated and dried using a heat spray dryer (spray dryer LBT-8i, manufactured by Ohkawara Kakohki Co., Ltd). In so doing, granulation-drying was carried out using a rotating disc for spraying, at 30,000 rpm rotation speed, 3 kg/hr slurry supply amount, and adjusting the temperature so that the drying tower exit temperature is 120° C.

After that, the spinel-type lithium transition metal oxide (sample) was obtained in the same manner as Example 1 by performing the calcination to heat treatment except that the condition for the calcination and heat treatment is changed to the condition described in Table 1.

Example 32

Lithium carbonate, electrolytic manganese dioxide, and iron (III) hydroxide were weighed such that they have a molar ratio of Li:Mn:Fe=1.06:1.903:0.037. Then, water was added in an amount of 9 times in weight ratio relative to the solid matter, and mixed and stirred to prepare 10% by weight slurry.

To the obtained slurry (raw material powder: 500 g), an ammonium salt of polycarboxylic acid (trade name: SN dispersant 5468, manufactured by San Nopco Limited) was added as a dispersant at 5% by weight with respect to the slurry solid content, and ground with a wet grinder at 3400 rpm for 40 minutes to obtain a mean particle diameter (D50) of less than 1 μm, that is, submicron order.

Next, the obtained ground slurry was granulated and dried using a heat spray dryer (spray dryer LBT-8i, manufactured by Ohkawara Kakohki Co., Ltd). In so doing, granulation-drying was carried out using a rotating disc for spraying, at 30,000 rpm rotation speed, 3 kg/hr slurry supply amount, and adjusting the temperature so that the drying tower exit temperature is 120° C.

After that, the spinel-type lithium transition metal oxide (sample) was obtained in the same manner as Example 1 by performing the calcination to heat treatment except that the condition for the calcination and heat treatment is changed to the condition described in Table 1.

TABLE 1

|  | Composition | Calcination ||||| Heat treatment Atmosphere |
|---|---|---|---|---|---|---|
|  |  | Atmosphere | Pressure of atmosphere | Oxygen partial pressure | Temperature × Time |  |
| Comparative Example 1 | Li1.004Mn1.899Mg0.037O4 | Normal pressure - Air | 0.10 MPa | 0.021 MPa | 930 × 14 h | — |
| Comparative Example 2 | Li1.079Mn1.888Mg0.033O4 | Normal pressure - Air | 0.10 MPa | 0.021 MPa | 930 × 14 h | Normal pressure - Air |
| Comparative Example 3 | Li1.081Mn1.881Mg0.038O4 | Increased oxygen pressure | 0.19 MPa | 0.19 MPa | 930 × 14 h | — |
| Comparative Example 4 | Li1.05Mn1.8Mg0.09Ti0.05Ca1.01O4 | Normal pressure - Air | 0.10 MPa | 0.021 MPa | 950 × 24 h | Normal pressure - Air |
| Example 1 | Li1.058Mn1.888Mg0.044O4 | Normal pressure - Air | 0.10 MPa | 0.021 MPa | 930 × 14 h | Increased oxygen pressure |
| Example 2 | Li1.081Mn1.884Mg0.035O4 | Normal pressure - Air | 0.10 MPa | 0.021 MPa | 930 × 14 h | Increased oxygen pressure |
| Example 3 | Li1.080Mn1.877Mg0.043O4 | Normal pressure - Air | 0.10 MPa | 0.021 MPa | 930 × 14 h | Increased oxygen pressure |
| Example 4 | Li1.05Mn1.86Mg0.09O4 | Normal pressure - Air | 0.10 MPa | 0.021 MPa | 930 × 14 h | Normal pressure - Oxygen |
| Example 5 | Li1.094Mn1.876Mg0.030O4 | Normal pressure - Air | 0.10 MPa | 0.021 MPa | 910 × 14 h | Normal pressure - Oxygen |
| Example 6 | Li1.060Mn1.903Mg0.037O4 | Normal pressure - Air | 0.10 MPa | 0.021 MPa | 930 × 14 h | Normal pressure - Oxygen |
| Example 7 | Li1.060Mn1.902Mg0.019Ti0.019O4 | Normal pressure - Air | 0.10 MPa | 0.021 MPa | 930 × 14 h | Normal pressure - Oxygen |
| Example 8 | Li1.060Mn1.903Ni0.027O4 | Normal pressure - Air | 0.10 MPa | 0.021 MPa | 930 × 14 h | Normal pressure - Oxygen |
| Example 9 | Li1.060Mn1.903Co0.037O4 | Normal pressure - Air | 0.10 MPa | 0.021 MPa | 930 × 14 h | Normal pressure - Oxygen |
| Example 29 | Li1.060Mn1.903Mg0.037O4 | Normal pressure - Air | 0.10 MPa | 0.021 MPa | 940 × 14 h | Normal pressure - Oxygen |
| Example 30 | Li1.052Mn1.911Mg0.037O4 | Normal pressure - Air | 0.10 MPa | 0.021 MPa | 940 × 14 h | Normal pressure - Oxygen |
| Example 31 | Li1.000Mn1.903Ti0.037O4 | Normal pressure - Air | 0.10 MPa | 0.021 MPa | 970 × 14 h | Normal pressure - Oxygen |
| Example 32 | Li0.060Mn1.903Fe0.037O4 | Normal pressure - Air | 0.10 MPa | 0.021 MPa | 970 × 14 h | Normal pressure - Oxygen |

TABLE 1-continued

| | | Heat treatment | | | | |
|---|---|---|---|---|---|---|
| | | Pressure of atmosphere | Oxygen partial pressure | Oxygen concentration in gas | First oxygen release temperature | Temperature × Time | Cooling rate |
| | Comparative Example 1 | — | — | — | 715° C. | — | — |
| | Comparative Example 2 | 0.10 MPa | 0.021 MPa | 21% | 715° C. | 750° C. × 14 h | 1.04° C./min |
| | Comparative Example 3 | — | — | — | 715° C. | — | — |
| | Comparative Example 4 | 0.10 MPa | 0.021 MPa | 21% | — | 800° C. × 10 h | 1.04° C./min |
| | Example 1 | 0.11 MPa | 0.11 MPa | 100% | 715° C. | 750° C. × 14 | 0.70° C./min |
| | Example 2 | 0.19 MPa | 0.19 MPa | 100% | 715° C. | 750° C. × 14 | 0.70° C./min |
| | Example 3 | 0.11 MPa | 0.11 MPa | 100% | 715° C. | 750° C. × 1 h | 1.04° C./min |
| | Example 4 | 0.10 MPa | 0.10 MPa | 100% | 724° C. | 774° C. × 2 h | 1.04° C./min |
| | Example 5 | 0.10 MPa | 0.10 MPa | 100% | 715° C. | 730° C. × 2 h | 1.04° C./min |
| | Example 6 | 0.10 MPa | 0.10 MPa | 100% | 715° C. | 750° C. × 2 h | 1.17° C./min |
| | Example 7 | 0.10 MPa | 0.10 MPa | 100% | 725° C. | 750° C. × 2 h | 1.17° C./min |
| | Example 8 | 0.10 MPa | 0.10 MPa | 100% | 727° C. | 760° C. × 2 h | 1.17° C./min |
| | Example 9 | 0.10 MPa | 0.10 MPa | 100% | 733° C. | 763° C. × 2 h | 1.17° C./min |
| | Example 29 | 0.10 MPa | 0.10 MPa | 100% | 715° C. | 750° C. × 2 h | 1.17° C./min |
| | Example 30 | 0.10 MPa | 0.10 MPa | 100% | 722° C. | 750° C. × 2 h | 1.17° C./min |
| | Example 31 | 0.10 MPa | 0.10 MPa | 100% | 691° C. | 730° C. × 2 h | 1.17° C./min |
| | Example 32 | 0.10 MPa | 0.10 MPa | 100% | 704° C. | 740° C. × 2 h | 1.17° C./min |

TABLE 2

| | XRD | | | | Charging rate 3 C/0.1 C | High temperature cycle life characteristics | |
|---|---|---|---|---|---|---|---|
| | Crystallite size | Strain | SSA | Crystallite size/SSA | | 0.1 C | 1 C |
| | nm | | m²/g | nm/(m²/g) | (%) | | |
| Comparative Example 1 | 253 | 0.0985 | 0.20 | 1265 | 95 | 99 | 99 |
| Comparative Example 2 | 226 | 0.1352 | 0.18 | 1256 | 96 | 100 | 100 |
| Comparative Example 3 | 153 | 0.0973 | 0.19 | 805 | 98 | 99 | 98 |
| Comparative Example 4 | 198 | 0.2776 | 0.30 | 660 | 100 | 98 | 96 |
| Example 1 | 501 | 0.0352 | 0.20 | 2505 | 112 | 100.9 | 102.9 |
| Example 2 | 478 | 0.0377 | 0.18 | 2656 | 113 | 100.9 | 103.4 |
| Example 3 | 293 | 0.0326 | 0.16 | 1831 | 109 | 100.6 | 101.8 |
| Example 4 | 282 | 0.0827 | 0.20 | 1410 | 101 | 100.0 | 100.5 |
| Example 5 | 217 | 0.0434 | 0.21 | 1033 | 106 | 100.4 | 100.5 |
| Example 6 | 318 | 0.0484 | 0.40 | 796 | 113 | 100.0 | 101.5 |
| Example 7 | 266 | 0.0291 | 0.15 | 1774 | 110 | 100.7 | 101.7 |
| Example 8 | 234 | 0.0767 | 0.15 | 1558 | 104 | 100.5 | 101.1 |
| Example 9 | 282 | 0.0537 | 0.19 | 1485 | 105 | 100.0 | 100.0 |
| Example 29 | 256 | 0.0382 | 0.17 | 1506 | 107 | 100.5 | 101.7 |
| Example 30 | 282 | 0.0323 | 0.18 | 1567 | 104 | 100.4 | 101.6 |
| Example 31 | 245 | 0.0872 | 0.16 | 1532 | 104 | 100.3 | 102.3 |
| Example 32 | 241 | 0.0743 | 0.16 | 1506 | 106 | 100.2 | 101.1 |

TABLE 3

| | Composition | Atmosphere | Calcination | | | Heat treatment Atmosphere |
|---|---|---|---|---|---|---|
| | | | Pressure of atmosphere | Oxygen partial pressure | Temperature × Time | |
| Example 10 | Li$_{1.084}$Mn$_{1.880}$Mg$_{0.036}$O$_4$ | Normal pressure - Air | 0.10 MPa | 0.021 MPa | 930 × 14 h | Normal pressure - Oxygen |
| Example 11 | Li$_{1.084}$Mn$_{1.878}$Mg$_{0.038}$O$_4$ | Normal pressure - Air | 0.10 MPa | 0.021 MPa | 930 × 14 h | Normal pressure - Oxygen |
| Example 12 | Li$_{1.083}$Mn$_{1.874}$Mg$_{0.043}$O$_4$ | Normal pressure - Air | 0.10 MPa | 0.021 MPa | 930 × 14 h | Normal pressure - Oxygen |
| Example 13 | Li$_{1.103}$Mn$_{1.868}$Mg$_{0.029}$O$_4$ | Normal pressure - Air | 0.10 MPa | 0.021 MPa | 930 × 14 h | Normal pressure - Oxygen |
| Example 14 | Li$_{1.097}$Mn$_{1.859}$Mg$_{0.044}$O$_4$ | Normal pressure - Air | 0.10 MPa | 0.021 MPa | 930 × 14 h | Normal pressure - Oxygen |

TABLE 3-continued

| | | | | | | | |
|---|---|---|---|---|---|---|---|
| Example 15 | Li1.089Mn1.882Mg0.029O4 | Normal pressure - Air | 0.10 MPa | 0.021 MPa | 930 × 14 h | Normal pressure - Oxygen | |
| Example 16 | Li0.099Mn1.869Mg0.032O4 | Normal pressure - Air | 0.10 MPa | 0.021 MPa | 930 × 14 h | Normal pressure - Oxygen | |
| Example 17 | Li1.069Mn1.901Mg0.030O4 | Normal pressure - Nitrogen | 0.10 MPa | 0.015 MPa | 930 × 14 h | Normal pressure - Oxygen | |
| Example 18 | Li1.050Mn1.906Mg0.044O4 | Normal pressure - Oxygen | 0.10 MPa | 0.075 MPa | 930 × 14 h | Normal pressure - Oxygen | |
| Example 19 | Li1.055Mn1.915Mg0.030O4 | Increased pressure - Oxygen | 0.15 MPa | 0.015 MPa | 930 × 30 h | Normal pressure - Oxygen | |
| Example 20 | Li1.064Mn1.891Mg0.045O4 | Normal pressure - Air | 0.10 MPa | 0.021 MPa | 930 × 14 h | Normal pressure - Oxygen | |
| Example 21 | Li1.058Mn1.910Mg0.032O4 | Normal pressure - Nitrogen | 0.10 MPa | 0.015 MPa | 850 × 30 h | Normal pressure - Oxygen | |
| Example 22 | Li1.058Mn1.904Mg0.038O4 | Normal pressure - Air | 0.10 MPa | 0.021 MPa | 1000 × 1 h | Normal pressure - Oxygen | |
| Example 23 | Li1.076Mn1.887Mg0.037O4 | Normal pressure - Air | 0.10 MPa | 0.021 MPa | 930 × 14 h | Normal pressure - Oxygen | |
| Example 24 | Li1.078Mn1.882Mg0.040O4 | Normal pressure - Air | 0.10 MPa | 0.021 MPa | 930 × 14 h | Normal pressure - Oxygen | |
| Example 25 | Li1.060Mn1.903Mg0.037O4 | Normal pressure - Air | 0.10 MPa | 0.021 MPa | 910 × 14 h | Normal pressure - Oxygen | |
| Example 26 | Li1.061Mn1.924Mg0.015O4 | Normal pressure - Air | 0.10 MPa | 0.021 MPa | 910 × 14 h | Normal pressure - Oxygen | |
| Example 27 | Li1.057Mn1.871Mg0.072O4 | Normal pressure - Air | 0.10 MPa | 0.021 MPa | 910 × 14 h | Normal pressure - Oxygen | |
| Example 28 | Li1.07Mn1.804Mg0.126O4 | Normal pressure - Air | 0.10 MPa | 0.021 MPa | 910 × 14 h | Normal pressure - Oxygen | |
| Comparative Example 5 | Li1.060Mn1.903Mg0.037O4 | Normal pressure - Air | 0.10 MPa | 0.021 MPa | 930 × 14 h | Normal pressure - Oxygen | |
| Comparative Example 6 | Li1.060Mn1.792Mg0.148O4 | Normal pressure - Air | 0.10 MPa | 0.021 MPa | 910 × 14 h | Normal pressure - Oxygen | |

| | Heat treatment | | | | | |
|---|---|---|---|---|---|---|
| | Pressure of atmosphere | Oxygen partial pressure | Oxygen concentration in gas | First oxygen release temperature | Temperature × Time | Cooling rate |
| Example 10 | 0.10 MPa | 0.035 MPa | 35% | 715° C. | 750° C. × 10 h | 1.04° C./min |
| Example 11 | 0.10 MPa | 0.050 MPa | 50% | 715° C. | 750° C. × 2 h | 1.04° C./min |
| Example 12 | 0.10 MPa | 0.066 MPa | 66% | 715° C. | 750° C. × 5 min | 1.04° C./min |
| Example 13 | 0.10 MPa | 0.085 MPa | 85% | 715° C. | 750° C. × 5 min | 1.04° C./min |
| Example 14 | 0.10 MPa | 0.090 MPa | 90% | 715° C. | 750° C. × 5 min | 1.04° C./min |
| Example 15 | 0.10 MPa | 0.094 MPa | 94% | 715° C. | 750° C. × 5 min | 1.04° C./min |
| Example 16 | 0.10 MPa | 0.10 MPa | 100% | 715° C. | 670° C. × 5 min | 1.04° C./min |
| Example 17 | 0.10 MPa | 0.10 MPa | 100% | 715° C. | 750° C. × 2 h | 1.04° C./min |
| Example 18 | 0.10 MPa | 0.10 MPa | 100% | 715° C. | 750° C. × 2 h | 1.04° C./min |
| Example 19 | 0.10 MPa | 0.10 MPa | 100% | 715° C. | 750° C. × 2 h | 1.04° C./min |
| Example 20 | 0.10 MPa | 0.10 MPa | 100% | 715° C. | 690° C. × 2 h | 1.04° C./min |
| Example 21 | 0.10 MPa | 0.10 MPa | 100% | 713° C. | 670° C. × 2 h | 1.04° C./min |
| Example 22 | 0.10 MPa | 0.10 MPa | 100% | 716° C. | 750° C. × 2 h | 1.04° C./min |
| Example 23 | 0.10 MPa | 0.10 MPa | 100% | 715° C. | 750° C. × 5 min | 5° C./min |
| Example 24 | 0.10 MPa | 0.10 MPa | 100% | 715° C. | 750° C. × 5 min | 10° C./min |
| Example 25 | 0.10 MPa | 0.10 MPa | 100% | 707° C. | 750° C. × 2 h | 1.04° C./min |
| Example 26 | 0.10 MPa | 0.10 MPa | 100% | 710° C. | 750° C. × 2 h | 1.04° C./min |
| Example 27 | 0.10 MPa | 0.10 MPa | 100% | 707° C. | 750° C. × 2 h | 1.04° C./min |
| Example 28 | 0.10 MPa | 0.10 MPa | 100% | 700° C. | 740° C. × 2 h | 1.04° C./min |
| Comparative Example 5 | 0.10 MPa | 0.10 MPa | 100% | 715° C. | 610° C. × 5 min | 1.04° C./min |
| Comparative Example 6 | 0.10 MPa | 0.10 MPa | 100% | 690° C. | 735° C. × 2 h | 1.04° C./min |

TABLE 4

| | XRD | |
|---|---|---|
| | Crystallite size nm | Strain |
| Example 10 | 260 | 0.0855 |
| Example 11 | 264 | 0.066 |
| Example 12 | 266 | 0.0452 |
| Example 13 | 261 | 0.0463 |
| Example 14 | 262 | 0.0205 |
| Example 15 | 258 | 0.0394 |
| Example 16 | 207 | 0.0676 |
| Example 17 | 262 | 0.0347 |
| Example 18 | 202 | 0.0333 |
| Example 19 | 318 | 0.0334 |
| Example 20 | 263 | 0.0473 |
| Example 21 | 201 | 0.0812 |
| Example 22 | 285 | 0.0633 |
| Example 23 | 263 | 0.0491 |
| Example 24 | 258 | 0.0514 |
| Example 25 | 253 | 0.0467 |
| Example 26 | 252 | 0.0435 |
| Example 27 | 272 | 0.0494 |
| Example 28 | 228 | 0.0868 |
| Comparative Example 5 | 265 | 0.0917 |
| Comparative Example 6 | 208 | 0.1001 |

(Discussion)

In the case of Comparative Example 1, an oxygen deficient state was caused by calcination as no heat treatment was performed. Thus, strain in the crystal structure was large and the crystallite size was smaller than those of Examples 1 to 3, and as a result, rate characteristics and high temperature cycle life characteristics were all poor.

In the case of Comparative Example 2, since the heat treatment was carried out under the normal pressure•air atmosphere, the oxygen partial pressure was insufficient and oxygen absorption was low. As a result, strain in the crystal structure was large and, particularly poor rate characteristics were yielded. In addition, as the Mn oxides had a thermal reduction property (for example, $MnO_2$ was reduced to $Mn_2O_3$ at approximately 560° C.) to release oxygen under heating, from the viewpoint of equilibrium theory, it was believed that the oxygen partial pressure to fully receive the oxygen in the crystal structure was not achieved.

It was found that, when calcination was carried out with increased oxygen pressure like Comparative Example 3, the crystallite size became smaller, and thus rate characteristics and high temperature cycle life characteristics were all impaired. Since the reaction for heating to near 900° C. was a reaction for particle growth with oxygen released at the first oxygen release temperature, the second oxygen release temperature, or the like, when calcination was carried out with increased oxygen partial pressure, both the first oxygen release temperature and the second oxygen release temperature shifted to the high temperature side. As a result, it was believed that the crystal growth reaction could not progress, yielding smaller crystallite size.

Further, In JP 2006-252940 A, a method of producing LMO including calcining at 900 to 1000° C. under oxidative atmosphere and then annealing at 600 to 900° C. under oxidative atmosphere is disclosed. However, it was confirmed that, when the calcination and annealing were performed under the same atmosphere, no excellent results like Examples could be obtained as illustrated in Comparative Examples 2 and 4.

As compared to Comparative Examples 1 to 3, when calcination was performed at the temperature of 850° C. or higher under air atmosphere and the heat treatment was performed in the temperature range of from the first oxygen release temperature to the first oxygen release temperature +50° C. under the atmosphere with higher oxygen partial pressure than that of the air like Examples 1 to 9 and Examples 29 to 32, it was found that the crystallite size was increased and the strain in the crystal structure could be suppressed, yielding lower strain and stronger structure. As a result, output characteristics (rate characteristics) and high temperature cycle life characteristics could be obtained simultaneously. It was found that the same results were also obtained from Examples 10 to 28.

The BET specific surface area (SSA) of the LMO obtained from Examples 1 to 32 was 0.1 to 0.4 m$^2$/g.

More specifically speaking, the LMO having crystallite size of between 200 nm and 1000 nm and strain of 0.0900 or less like the LMO obtained from Examples 1 to 32 could simultaneously achieve output characteristics (rate characteristics) and high temperature cycle life characteristics, and also excellent rapid charging characteristics.

Meanwhile, the result of the high temperature cycle life characteristics at the rate of 1 C is also an indicator indicating the output characteristics. Specifically, by evaluating at 1 C, that is, ten times the current of 0.1 C, it can also serve as an indicator which indicates whether or not the output characteristics of the material itself are excellent.

From this point of view, the crystallite size of the LMO of the invention is preferably between 200 nm and 1000 nm, more preferably between 250 nm and 900 nm, and still more preferably 600 nm or less.

It may be also considered that the strain of the LMO of the invention is preferably 0.0900 or less, more preferably 0.0800 or less, still more preferably 0.0600 or less, and particularly preferably 0.0400 or less.

The aforementioned effect was confirmed from the spinel-type lithium transition metal oxide containing, besides Li and Mn, an element selected from a group consisting of Mg, Ti, Ni, Co, and Fe, as illustrated in Examples. Further, the same effect was confirmed from the spinel-type lithium transition metal oxide containing Mg and Ti besides Li and Mn, and therefore it was expected that the same effect was also obtained from the spinel-type lithium transition metal oxide containing two or more elements selected from a group consisting of Mg, Ti, Ni, Co, and Fe.

In this regard, for the case like Comparative Example 4 relating to the spinel-type lithium transition metal oxide containing Mg, Ti, and Ca besides Li and Mn, it was found that, the spinel-type lithium transition metal oxide having crystallite size of between 200 nm and 1000 nm and strain of 0.0900 or less was not obtained. Further, in case in which Ca was contained, the output characteristics (rate characteristics) and high temperature cycle life characteristics were not obtained at the same level as those of Examples.

In addition, based on the results of Table 2 and the results of various tests carried out until now, it was found that, having the crystallite size/BET specific surface area value within the range of 1500 nm/(m$^2$/g) to 3000 nm/(m$^2$/g), preferably within the range of 1700 nm/(m$^2$/g) to 3000 nm/(m$^2$/g), and particularly preferably within the range of 2400 nm/(m$^2$/g) to 3000 nm/(m$^2$/g) was desirable especially in terms of the high temperature cycle life characteristics value (1 C) among the properties of the LMO of the invention.

The invention claimed is:

1. A spinel-structured lithium transition metal oxide comprising, besides Li and Mn, one or more elements selected from a group consisting of Mg, Ti, Ni, Co, and Fe, and having crystallite size of between 200 nm and 1000 nm measured by following measurement method and strain of 0.0900 or less measured by the following measurement method:

(Crystallite size and measurement method of strain)
Providing a sample in powder form, the crystallite size and strain are measured by the Rietveld method using a fundamental method, wherein:
an x ray diffractometer using a Cu—Kα beam is used for the measurements of x ray diffraction patterns, peaks of the x ray diffraction patterns obtained from a range of diffraction angle 2θ=10 to 120° are analyzed using an analysis software to determine the crystallite size and strain;
in the measurement method the crystal structure belongs to the cubic crystal from the space group Fd-3m of Origin Choice 2, and Li is present at the 8a site thereof, Mn, a substitute element of Mn, and an extra Li fraction x are present at the 16d site thereof, and O is present at the 32e site thereof, the parameter Beq. is fixed to 1, and with the fractional coordinates of oxygen serving as variables and watching for the indices representing the extent of the match between the observed intensities and the calculated intensities Rwp<10.0 and GOF<2.0, the calculation is performed repeatedly until they converged, the crystallite size and the strain are analyzed using the Gauss function;
the instrument specifications and conditions that are used for other measurements and Rietveld method analyses are as follows:
Detector: PSD
Type Detector: VANTEC-1
High Voltage: 5585 V
Discr. Lower Level: 0.35 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm Sample Length: 25 mm
Receiving Slit Length: 12 mm
Primary Sollers: 2.623°
Secondary Sollers: 2.623°
Lorentzian, 1/Cos: 0.004933548 Th.

2. The spinel-structured lithium transition metal oxide according to claim 1, wherein the strain is 0.0800 or less.

3. The spinel-structured lithium transition metal oxide according to claim 2, wherein the strain is 0.0600 or less.

4. The spinel-structured lithium transition metal oxide according to claim 2, wherein the strain is 0.0400 or less.

5. The spinel-structured lithium transition metal oxide according to claim 1, wherein the strain is 0.0600 or less.

6. The spinel-structured lithium transition metal oxide according to claim 2, wherein BET specific surface area (SSA) is 0.1 to 0.4 $m^2/g$.

7. The spinel-structured lithium transition metal oxide according to claim 2, wherein crystallite size/BET specific surface area value is 1500 $nm/(m^2/g)$ to 3000 $nm/(m^2/g)$.

8. A positive electrode active material for lithium batteries, comprising the spinel-structured lithium transition metal oxide according to claim 2.

9. A lithium battery for an electric vehicle or a hybrid electric vehicle, comprising the positive electrode active material for lithium batteries according to claim 8.

10. The spinel-structured lithium transition metal oxide according to claim 5, wherein the strain is 0.0400 or less.

11. The spinel-structured lithium transition metal oxide according to claim 5, wherein BET specific surface area (SSA) is 0.1 to 0.4 $m^2/g$.

12. The spinel-structured lithium transition metal oxide according to claim 1, wherein the strain is 0.0400 or less.

13. The spinel-structured lithium transition metal oxide according to claim 12, wherein BET specific surface area (SSA) is 0.1 to 0.4 $m^2/g$.

14. The spinel-structured lithium transition metal oxide according to claim 1, wherein BET specific surface area (SSA) is 0.1 to 0.4 $m^2/g$.

15. The spinel-structured lithium transition metal oxide according to claim 14, wherein crystallite size/BET specific surface area value is 1500 $nm/(m^2/g)$ to 3000 $nm/(m^2/g)$.

16. The spinel-structured lithium transition metal oxide according to claim 1, wherein crystallite size/BET specific surface area value is 1500 $nm/(m^2/g)$ to 3000 $nm/(m^2/g)$.

17. A positive electrode active material for lithium batteries, comprising the spinel-structured lithium transition metal oxide according to claim 16.

18. A lithium battery for an electric vehicle or a hybrid electric vehicle, comprising the positive electrode active material for lithium batteries according to claim 17.

19. A positive electrode active material for lithium batteries, comprising the spinel-structured lithium transition metal oxide according to claim 1.

20. A lithium battery for an electric vehicle or a hybrid electric vehicle, comprising the positive electrode active material for lithium batteries according to claim 19.

* * * * *